(12) United States Patent
Hyziak et al.

(10) Patent No.: US 6,668,043 B2
(45) Date of Patent: Dec. 23, 2003

(54) SYSTEMS AND METHODS FOR TRANSMITTING AND RECEIVING TEXT DATA VIA A COMMUNICATION DEVICE

(75) Inventors: Janusz Hyziak, Des Plaines, IL (US); Nandakishore Albal, Scottsdale, AZ (US)

(73) Assignee: Motorola, Inc., Schaumburg, IL (US)

(*) Notice: Subject to any disclaimer, the term of this patent is extended or adjusted under 35 U.S.C. 154(b) by 189 days.

(21) Appl. No.: 09/956,450

(22) Filed: Sep. 19, 2001

(65) Prior Publication Data

US 2002/0057765 A1 May 16, 2002

Related U.S. Application Data

(60) Provisional application No. 60/249,103, filed on Nov. 16, 2000.

(51) Int. Cl.[7] ............................................. H04M 11/00
(52) U.S. Cl. .................. 379/52; 379/93.15; 379/93.26; 379/88.14; 455/414.4
(58) Field of Search ............................ 379/52, 93.01, 379/93.05–93.09, 93.14, 93.15, 93.18, 93.26, 88.13–88.16, 201.01; 455/412–414, 412.1–414.4

(56) References Cited

U.S. PATENT DOCUMENTS 5,253,285 A * 10/1993 Alheim ........................ 379/52
6,389,114 B1 * 5/2002 Dowens et al. ............... 379/52

* cited by examiner

Primary Examiner—Wing Chan
(74) Attorney, Agent, or Firm—Hisashi D. Watanabe

(57) ABSTRACT

A method of transmitting and receiving text data via a communication device is provided. In one embodiment, an incoming message is received at a communication node. The node determines whether the incoming message comprises text data. If so, the incoming message is forwarded to a communication device. If not, the message is forwarded to a text interface. In another embodiment, an instruction signal is received at a communication node. Based on the instruction signal, a connection is established with a communication device. A text message is then received. The node determines if the device can receive the text-message. If so, the message is forwarded to the device. If not, the message is forwarded to a text interface.

6 Claims, 4 Drawing Sheets

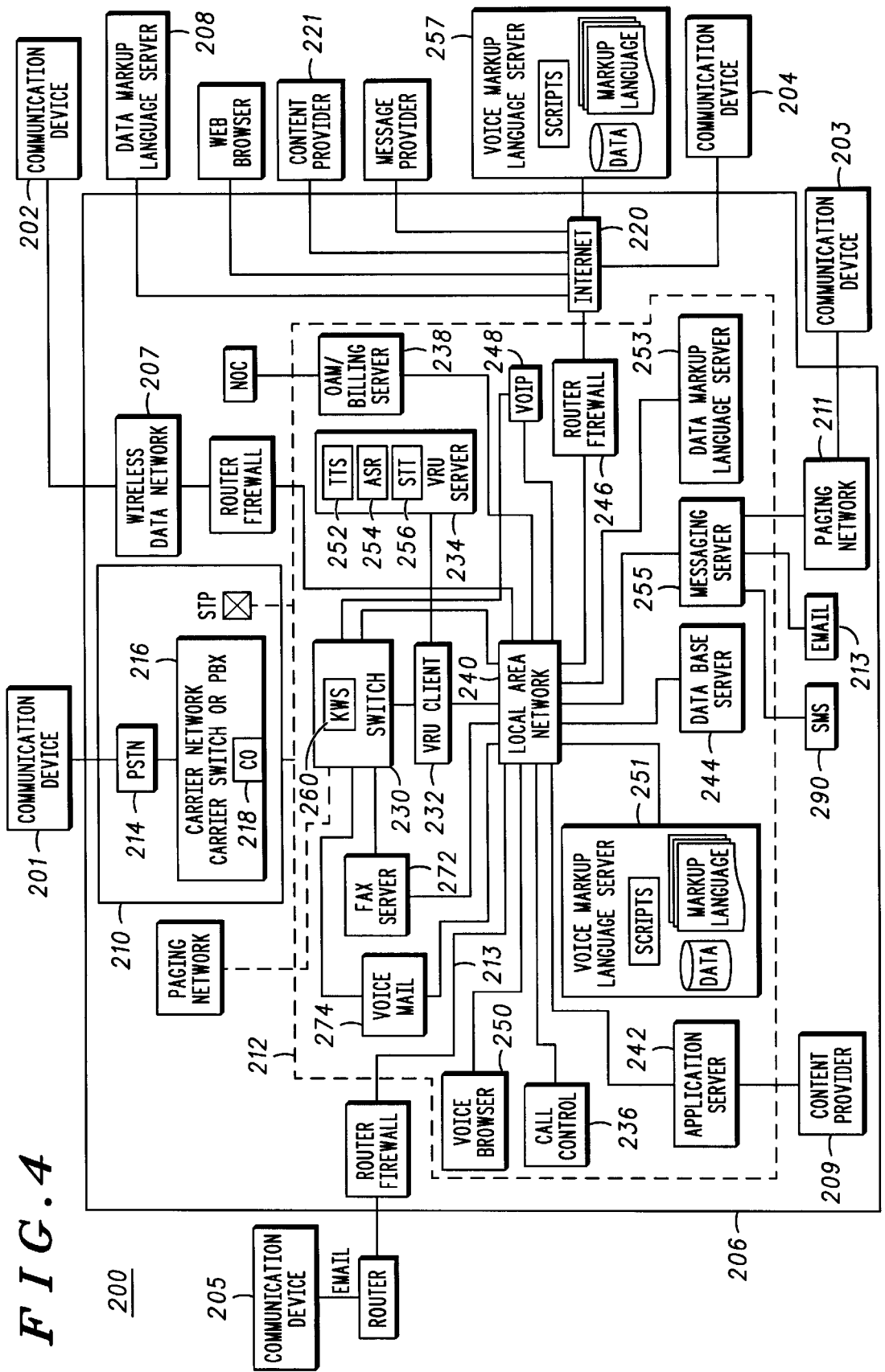

SYSTEMS AND METHODS FOR TRANSMITTING AND RECEIVING TEXT DATA VIA A COMMUNICATION DEVICE

RELATED APPLICATIONS

This is a continuation of U.S. Provisional Application No. 60/249,103, filed on Nov. 16, 2000.

FIELD OF THE INVENTION

The present invention generally relates to communication systems, and, more particularly, to methods and systems for transmitting and receiving text data via a communication device.

BACKGROUND OF THE INVENTION

Telecommunication Devices for the Deaf (TDDs), Telephone Text Devices (TTDs) and a Text Telephones (TTY) are examples of communication devices which allow hearing-impaired users or subscribers to communicate using text messages. Typically, the user enters a desired text message into the TDD, TTD or TTY. The text message is transmitted, over a communication line, to another TDD, TTD or TTY. Alternatively, the text message may be transmitted to another communication device possessing the capability to process the text message.

Presently, users of TDD and other hearing-impaired devices have to connect their portable TDDs to analog telephone networks in order to transmit a text message since digital cellular networks usually do not possess the ability to process TDD tones. Additionally, the telecommunications relay service (i.e., the system in which the TDD messages are converted and transmitted across the communication network) is not currently automated to perform the necessary conversion and transmission process nor does it possess the ability to allow TDD users to converse with non-TDD users in an efficient manner.

BRIEF DESCRIPTION OF THE DRAWINGS

FIG. 4 is an exemplary block diagram of another embodiment of a communication system in accordance with the present invention.

DETAILED DESCRIPTION OF THE PRESENTLY PREFERRED EMBODIMENTS

Figure 1:
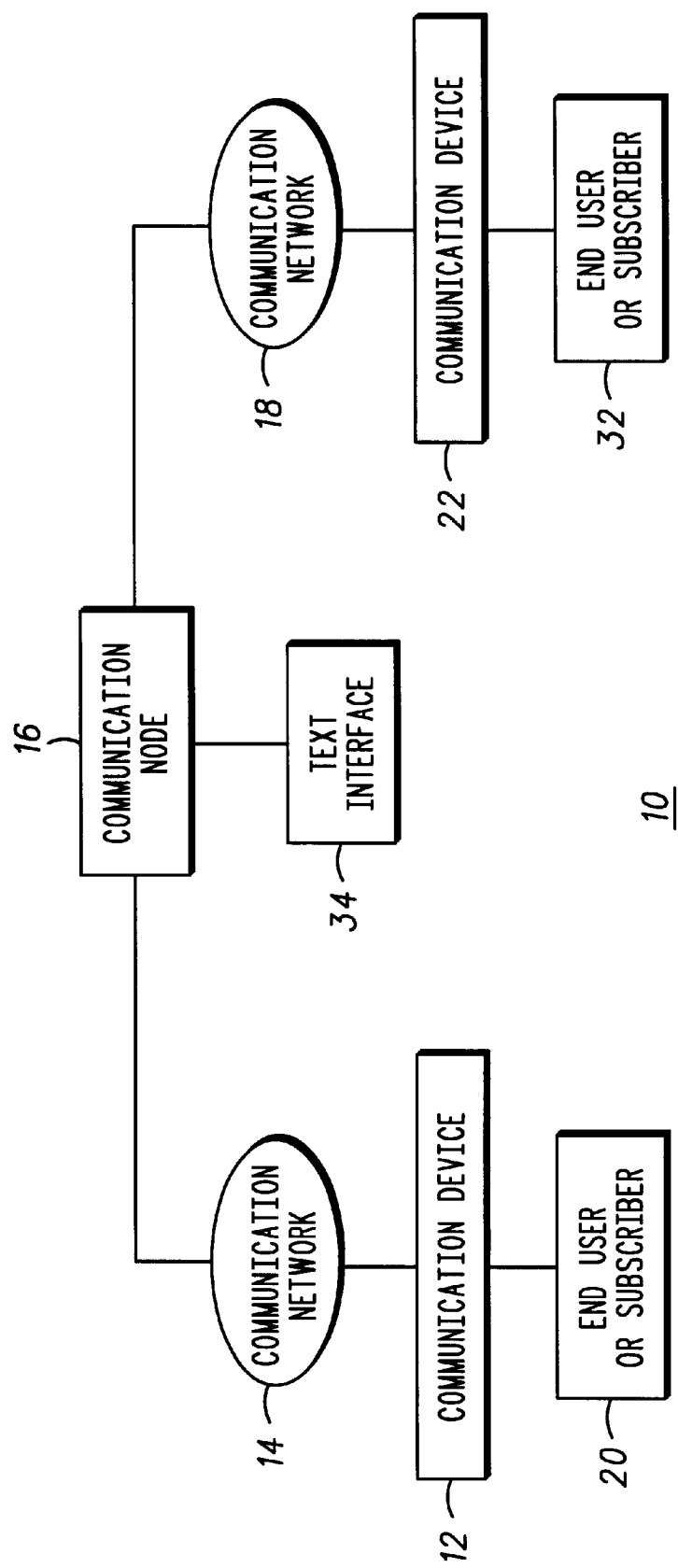
FIG. 1 is a block diagram of an embodiment of a communication system in accordance with the present invention.

FIG. 1 is a block diagram that illustrates an embodiment of a communication system 10. The communication system 10 generally includes one or more network access devices or communication devices 12, 22, communication networks 14, 18 and a communication node 16. As further described below, the communication system 10 can provide various services to the end users of the communication system 10. For example, the communication system 10 provides a method for receiving and transmitting a message between a TDD user and a non-TDD user.

The communication device 12 of the communication system 10 can be utilized by end user 20 to communicate and/or connect with the communication device 22 via communication node 16. The communication devices 12, 22 can include, but are not limited to, Telephone Devices for the Deaf (TDDs), Telephone Text Devices (TTDs), Text Telephones (TTYs), wireline telephones, mobile telephones, paging units, radio units, wireless data devices, Web telephones, portable or wireless telephones, personal information managers (PIMs), personal digital assistants (PDAs), personal computers (PCs), network televisions (TVs), Internet TVs, Internet telephones, portable wireless devices (i.e., two-way pagers), security systems (both mobile and premises-based), workstations or any other suitable communication devices.

The communication devices 12, 22 communicate with the communication node 16 via the communication networks 14, 18. The communication networks 14, 18 can interface with the communication devices 12, 22 through wireline or wireless networks or systems (i.e., telephone or televisions systems, Integrated Services Digital Network (ISDN) systems, coaxial lines, computer networks, digital end user lines, private networks, wireless local loop systems, etc.).

The communication networks 14, 18 of the communication system 10 can include, but are not limited to, intranets, extranets, the Internet, a Local Area Network (LAN), a telephone network, (e.g., a Public Switched Telephone Network (PSTN), private telephone networks, etc.), a cellular network, satellite networks, a personal communication system, a TV network (e.g., a cable TV system), local, regional, national or global paging networks, an email system, a wireless data network (e.g., satellite data or local wireless data networks), a wireless LAN, a wireless local loop/distribution system (e.g., LMDS, MMDS or Code Division Multiple Access (CDMA) based system), a Voice Over Internet Protocol (VOIP) network, or any other suitable network. The communication networks 14, 18 can also include a Wide Area Network (WAN), such as, for example, the Internet, the World Wide Web (WWW) or any other similar on-line service. It will be recognized that the communication networks 14, 18 may have portions in common, may comprise two separate networks, or may be the same network.

The communication node 16 of the communication system 10 can include, but is not limited to, an interactive voice response node, a server computer, the MIX™ platform and the Myosphere™ Service provided by Motorola, Inc. of Schaumburg, Ill. (as further described with reference to FIG. 4), or other suitable system. It will be recognized that the communication node 16 may be integrated within or may be remote from the communication networks 14, 18.

The communication node 16 can provide assistance for hearing-impaired persons through the use of a text interface 34. The text interface 34 can be integrated with the communication node 10 or remote from the communication node 16. The text interface 34 preferably provides a hearing-impaired user or any other user the ability to transmit and receive text, TDD, and TTY messages. The text interface 34 allows users to communicate with other individuals in a number of ways. First, the text interface 34 can convert the message transmitted to the communication node 16 via the communication device 12 to a speech message and deliver the speech message to a recipient who may not possess the ability to receive TDD messages. Second, the text interface 34 can convert the text, TDD, or speech input from an end user to a text, TDD, TTD and TTY message for delivery to another end user who utilizes a TDD, TTD, TTY or other similar device.

Figure 2:
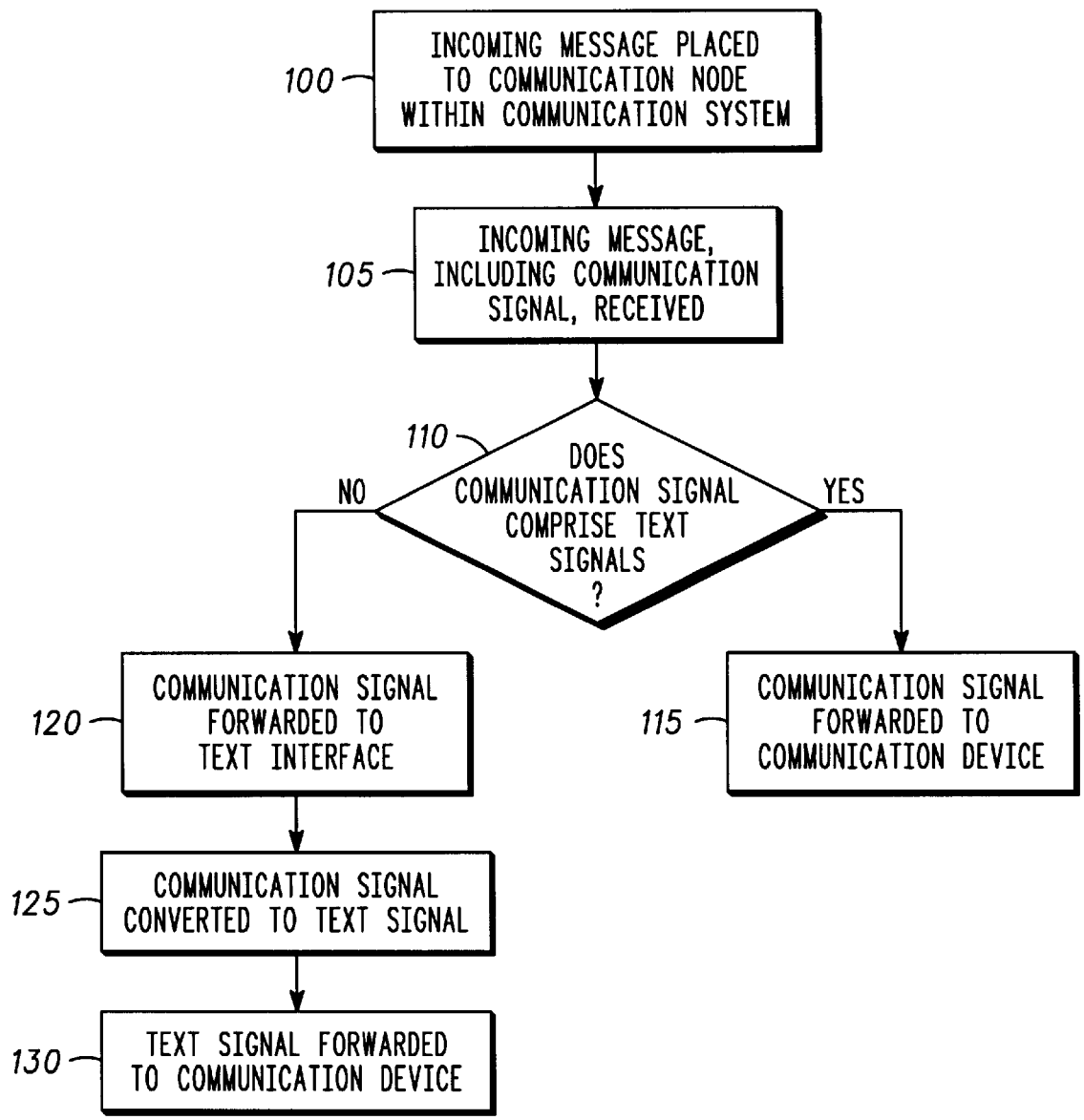
FIG. 2 is a flowchart of an embodiment of a method for receiving text data via a communication device.

Referring now to FIG. 2, one embodiment of a method for receiving text data or non TDD, TTD, and TTY tones via a communication device is shown. At block 100, an incoming message is placed by an end user within the communication system. The incoming message includes a communication signal. That represents incoming telephone communication transactions, such as, for example, an incoming telephone call, an incoming page transmission or an incoming email message. At block 105, the communication node receives the incoming message, including the communication signal.

At block 110, the communication node determines or detects whether the communication signal comprises text data indicative of the tones of a TTD, TTD, TTY or other device. The communication node determines or detects the presence of any TDD, TTD, or TTY tones present in the communication signal, such as, for example, Baudot language tones.

If the communication signal includes text data, the communication signal is not converted, and the communication node forwards the communication signal to a communication device at block 115. For purposes of this embodiment, the communication device includes a TDD, TTD, TTY or any other hearing assistance device. The end user may then communicate with the originator of the communication signal via the communication device. Preferably, the transmission of the communication signal to the communication device at block 115 occurs via a data communication channel. If, however, the communication signal does not include text data (i.e., the communication signal includes voice data), the communication node then forwards the communication signal to the text interface at block 120. After receiving the communication signal, the text interface converts the communication signal into a text signal at block 125. The conversion of the communication signal into a text signal can be performed by any well known processing function or service, such as, for example, Lernout & Hauspie's™ Automatic Speech Recognition products. The Lernout & Hauspie's™ Automatic Speech Recognition unit can convert the communication signal to ASCII characters. The ASCII characters are then modulated using Baudot language, or any other similar modulating code. Another example of this conversion is presented and more fully described in reference to the STT unit 256 of FIG. 4.

Upon the conversion of the communication signal into the text signal, the text interface then forwards the text signal to the communication device at block 130. At this point the end user, (i.e., the called party) may then communicate with the originator of the communication signal, (i.e., the calling party) via the communication device.

Figure 3:
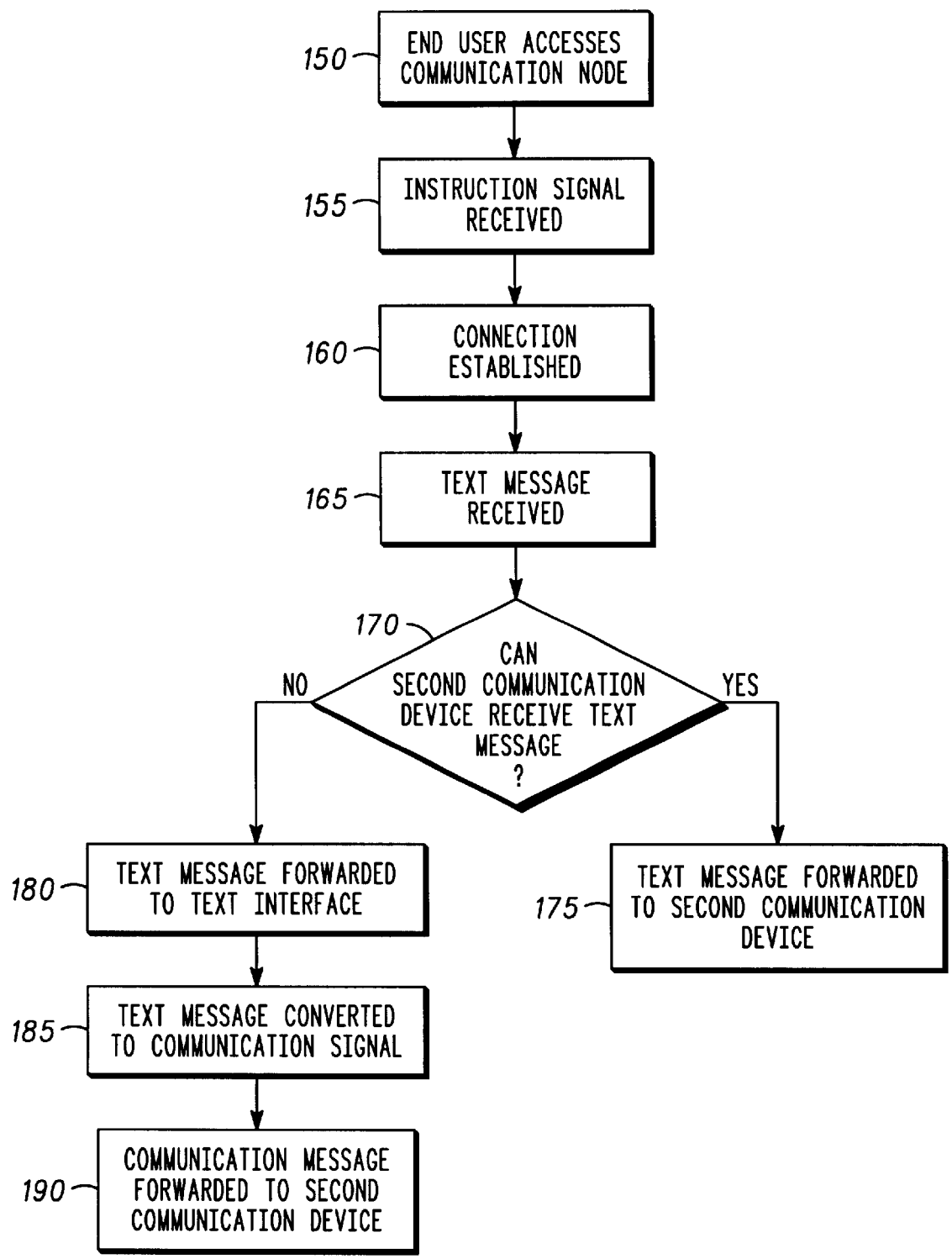
FIG. 3 is a flowchart of an embodiment of a method transmitting text data via a communication device.

Referring now to FIG. 3, one embodiment of a method for transmitting text data via a communication device is shown. At block 150, an end user, (i.e., a calling party) accesses the communication node via a first communication device. As an example, the first communication device can be a TDD, TTD, TTY or other similar device having the capability to transmit and receive TDD signals.

At block 155, the communication node receives an instruction signal from the first communication device to send an outgoing message, such as, for example, "Send message to John Doe" or "Call John Doe at 555-555-5555." Preferably, the communication between the first communication device and the communication node is via a data communication channel.

Upon receiving the instruction signal, the communication node establishes a connection or places a call to a second communication device at block 160. After establishing the connection with the second communication device, the communication node receives a text message from the first communication device at block 165. In the example described herein, the text signal may preferably be a TDD, TTD or TTY message.

At block 170, the communication node determines whether the second communication device is able to receive the text message. Preferably, the communication node makes this determination by monitoring TDD, TTD or TTY tones emitted from the second communication device.

If the second communication device is able to receive the text message, the communication node forwards the text signal to the second communication device at block 175. The calling party via the first communication devices may then communicate with the user of the second communication device (i.e., the called party).

If, however, the second communication device is not able to receive the text message, the communication node then forwards the text message to the text interface at block 180. After receiving the text message, the text interface converts the text message into a voice message at block 185. The conversion of the text signal into a voice signal can be performed by any well known processing function or service, such as, for example, Lernout & Hauspie's™ TTS 2000 products, as described above. The conversion process include translating the Baudot language to ASCII and then the Lernout & Hauspie's™ TTS 2000 unit can convert the text message a voice message. Another example of this conversion is presented and more fully described in reference to the TTS unit 252 of FIG. 4.

Alternatively, the communication node may determine that the second device is not voice and not TDD, TTY, or TTD. For example, a TDD user communicating with another user employing instant messaging. After receiving the text message, the text interface may convert the text message into a communication message capable of being received and processed by the second communication device. For example, if the second communication device is a data modem (or other device similar or integral to a PC), the conversion of the text message may be to a communication message readable by the data modem (i.e., ASCII, EBCDIC, etc.).

After the conversion of the text message into the communication message, the text interface then forwards the communication message to the second communication device at block 190. The calling party (through the first communication device) may then communicate with the called party (who is utilizing the second communication device).

Referring now to FIG. 4, an exemplary block diagram of another embodiment of a communication system 200 having the capability to transmit and receive text data via a communication device is illustrated. The communication system 200 can implement the routines described in FIGS. 2–3, above.

The communication system 200 generally includes one or more communication devices 201, 202, 203, 204, 205 (five being shown), an electronic network 206, and one or more information sources (e.g., content providers 208, 221 (two being shown) and data and voice markup language servers 209, 251, 253, 257).

The end user can access the electronic network 206 by dialing a single direct access telephone number (e.g., a foreign exchange telephone number, a local telephone number, or a toll-free telephone number or PBX) from the communication device 201. The end user can also access the electronic network 206 from the communication device 202 via the Internet 220 or WWW, from the communication device 203 via a paging network 211, or from the communication device 205 via a LAN, a WAN, an email connection or in any other similar manner.

As shown in FIG. 4, the electronic network 206 includes a telecommunication network 210 and a communication node 212. The telecommunication network 210 is preferably connected to the communication node 212 via a high-speed data link, such as, for example, a T1 telephone line, a LAN, a WAN or a VOIP network. The telecommunication network 210 preferably includes a PSTN 214 and a carrier network 216. The telecommunication network 210 can also include, for example, international or local exchange networks, cable TV networks, inter-exchange carrier or long distance carrier networks, cellular networks (e.g., mobile switching centers), PBXs, satellite systems, wireless data networks and other switching centers such as conventional or trunked radio systems (not shown), etc. The electronic network 206 can also include additional telecommunication networks, such as, for example, a wireless data network 207.

The PSTN 214 can include various types of communication equipment, such as, for example, ATM networks, Fiber Distributed Data networks (FDDI), T1 lines, cable TV networks, VOIP networks and the like. The carrier network 216 generally includes a telephone switching system or central office 218. It will be recognized that the carrier network 216 can be any suitable system that can route calls to the communication node 212, and the central office 218 can be any suitable wire-line or wireless switching system.

The communication node 212 is preferably configured to receive and process incoming calls from the carrier network 216 and the Internet 220. The communication node 212 can receive and process pages from the paging network 211 and can also receive and process messages (e.g., emails) from the LAN, WAN, wireless data or email system 213.

When an end user dials into the electronic network 206 from the communication device 201, the carrier network 216 routes the incoming call from the PSTN 214 to the communication node 212 over one or more telephone lines or trunks. The incoming calls preferably enter the carrier network 216 through one or more "888" or "800" Inward Wide Area Telecommunications Services trunk lines, local exchange or long distance trunk lines. It is also contemplated that the incoming calls can be received from a cable, cellular or VOIP network or any other suitable system.

The communication node 212 answers the incoming call from the carrier network 216 and retrieves an appropriate announcement (e.g., a welcome greeting) from a database, server or browser. The communication node 212 then plays the announcement to the caller. In response to audio inputs from the end user, the communication node 212 retrieves information from a destination or database of one or more of the information sources, such as the content providers 208, 221 or the markup language servers 209, 251, 253, 257. After the communication node 212 receives the information, it provides a response to the end user based upon the retrieved information. Alternatively, the communication node 212 may receive text data input, which is then routed to a text interface (not shown). The text interface processes the text data so that it may be read by a TDD user.

The communication node 212 can provide various dialog voice personalities (e.g., a female voice, a male voice, etc.), and can implement various grammars (e.g., vocabulary) to detect and respond to the audio inputs from the end user. In addition, the communication node 212 can automatically select various speech recognition models (e.g., English, Spanish or English accent models) based upon an end user's profile, communication device and/or speech patterns. The communication node 212 can also allow the end user to select a particular speech recognition model.

When an end user accesses the electronic network 206 from a communication device 201, 202, 203, 204, 205 registered with the system (e.g., home telephone, work telephone, cellular telephone, etc.), the communication node 212 can by-pass an end user screening option and automatically identify the end user (or the type of communication device) through the use of ANI or CLI. After the communication node 212 verifies the call, the communication node 212 provides a greeting (e.g., "Hi, this is your personal agent, Maya. Welcome Bob. How may I help you?"). The communication node 212 then enters into a dialogue with the end user, and the end user can select a variety of services offered by the communication node 212.

When the end user accesses the electronic network 206 from a communication device not registered with the system (e.g., a payphone, a telephone of a non-end user, etc.), the communication node 212 answers the call and prompts the end user to enter his or her name and/or a personal identification number (PIN) using voice commands or DTMF signals. The communication node 212 can also utilize speaker verification to identify the particular speech pattern of the end user. If the communication node 212 authorizes the end user to access the system, the communication node 212 provides a personal greeting to the end user (e.g., "Hi, this is your personal agent, Maya. Welcome Ann. How may I help you?").

The communication node 212 then enters into a dialogue with the end user, and the end user can select various services offered by the communication node 212. If the name and/or PIN of the end user cannot be recognized or verified by the communication node 212, the end user will be routed to a customer service representative.

Once the end user has accessed the communication system 200, the end user may implement a wide variety of services and features by using voice commands, such as, for example, voice dialing, voice paging, facsimiles, caller announcements, voice mails, reminders, call forwarding, call recording, content information (e.g., newspapers, etc.), read email, read calendars, read "to-do" lists, banking, e-commerce. The communication system 200 can place outbound calls and pages to business and personal parties or contacts (e.g., friends, clients, business associates, family members, etc.) in response to DTMF signals, TDD tones or voice commands. The calls can be routed through a telephone or electronic network to the selected party and the pagers can be sent to a selected party via a paging system. The communication system 200 can also receive calls routed through a telephone or electronic network.

As shown in FIG. 4, the communication node 212 preferably includes a telephone switch 230, a voice or audio recognition (VRU) client 232, a VRU server 234, a controller or call control unit 236, an Operation and Maintenance Office or a billing server unit 238, a LAN 240, an application server unit 242, a database server unit 244, a gateway server or router firewall server unit 246, a VOIP unit 248, a voice browser 250, a voice markup language server 251, a messaging server 255 and a data markup language server 253. Although the communication node 212 is shown as being constructed with various types of independent and separate units or devices, the communication node 212 can be implemented by one or more integrated circuits, microprocessors, microcontrollers or computers which may be programmed to execute the operations or functions equivalent to those performed by the devices or units shown. It will also be recognized that the communication node 212 can be carried out in the form of hardware components and circuit designs and/or software or computer programs.

The communication node 212 can be located in various geographic locations throughout the world or the United States (e.g., Chicago, Ill.). The communication node 212 can be operated by one or more carriers (e.g., Sprint, Qwest, MCI, etc.) or independent service providers (e.g., Motorola, Inc.). The communication node 212 can be integrated with the carrier network 216 or can be located remote from the carrier network 216. It is also contemplated that the communication node 212 may be integrated into a communication device, such as, for example, a wire-line or wireless telephone, a radio device, a PC, a PDA, a PIM, etc., and can be programmed to connect or link directly to an information source.

The communication node 212 can also be configured as a standalone system to allow end users to dial directly into the communication node 212 via a direct access telephone number. In addition, the communication node 212 may comprise a telephony switch (e.g., a PBX or Centrix unit), an enterprise network or a LAN. In this configuration, the communication system 200 can be implemented to automatically connect an end user to the communication node 212 when the end user accesses a communication device.

When the telephone switch 230 receives an incoming call from the carrier network 216, the call control unit 236 sets up a connection in the telephone switch 230 to the VRU client 232. The communication node 212 then enters into a dialog with the end user regarding various services and functions. The VRU client 232 preferably generates pre-recorded voice announcements and/or messages to prompt the end user to provide inputs to the communication node 212 using voice commands or DTMF signals.

The telephone switch 230 is preferably connected to the VRU client 232, the VOIP unit 248 and the LAN 240. The telephone switch 230 receives incoming calls from the carrier network 216. The telephone switch 230 also receives incoming calls from the communication device 202 routed over the Internet 220 via the VOIP unit 248. The telephone switch 230 also receives messages and pages from communication devices 203, 205, respectively. The telephone switch 230 is preferably a digital cross-connect switch, Model LNX, available from Excel Switching Corporation, Hyannis, Mass. It will be recognized that the telephone switch 230 can be any suitable switch.

The VRU client 232 is preferably connected to the VRU server 234 and the LAN 240. The VRU client 232 processes voice communications, DTMF signals, pages and messages (e.g., emails). Upon receiving voice communications, the VRU client 232 routes the speech communications to the VRU server 234. When the VRU client 232 detects DTMF signals, it sends a command to the call control unit 236. It will be recognized that the VRU client 232 can be integrated with the VRU server 234.

The VRU client 232 preferably comprises a PC, such as, for example, a Windows NT compatible PC, with hardware capable of connecting individual telephone lines directly to the telephone switch 230 or carrier network 216. The VRU client 232 preferably includes a microprocessor, random access memory, read-only memory, a T1 or ISDN interface board, and one or more voice communication processing boards (not shown). The voice communication processing boards are preferably Dialogic boards, Antares Model, available from Dialogic Corporation, Parsippany, N.J. The voice communication boards may include a voice recognition engine having a vocabulary for detecting a speech pattern. The voice recognition engine is preferably a RecServer software package, available from Nuance Communications, Menlo Park, Calif.

The VRU client 232 can also include an echo canceler (not shown) to reduce or cancel TTS or playback echoes transmitted from the PSTN 214 due to hybrid impedance mismatches. The echo canceler is preferably included in an Antares Board Support Package, also available from Dialogic.

The call control unit 236 is preferably connected to the LAN 240, and sets up the telephone switch 230 to connect incoming calls to the VRU client 232. The call control unit 236 also sets up incoming calls or pages to the communication node 212 over the Internet 220 and pages and messages sent from the communication devices 203, 205 via the paging network 211 and email system 213, respectively. The control call unit 236 preferably comprises a PC, such as, for example, a Windows NT compatible PC.

The LAN 240 allows the various components and devices of the communication node 212 to communicate with each other via twisted pair, fiber optic, coaxial cables or the like. The LAN 240 may use Ethernet, Token Ring or other suitable types of protocols. The LAN 240 is preferably a 100 Megabit per second Ethernet switch, available from Cisco Systems, San Jose, Calif., and can comprise any suitable network system. The communication node 212 may include a plurality of LANs.

The VRU server 234 is connected to the VRU client 232 and the LAN 240. The VRU server 234 receives voice communications from the end user via the VRU client 232. The VRU server 234 processes the voice communications and compares the voice communications against a vocabulary or grammar stored in the database server unit 244 or a similar memory device.

The VRU server 234 provides output signals, representing the result of the voice communications processing, to the LAN 240. The LAN 240 routes the output signal to the call control unit 236, the application server unit 242 and/or the voice browser 250. The communication node 212 then performs a specific function associated with the output signals.

The VRU server 234 preferably includes a TTS unit 252, an automatic speech recognition (ASR) unit 254, and a STT unit 256. The TTS unit 252 receives textual data or information (e.g., email, web pages, documents, files, etc.) from the application server unit 242, the database server unit 244, the call control unit 236, the gateway server unit 246, the application server unit 242 and the voice browser 250. The TTS unit 252 processes the textual data and converts the data to voice data or information.

The TTS unit 252 can provide data to the VRU client 232, which reads or plays the data to the end user. For example, when the end user requests information (e.g., news updates, stock information, traffic conditions, etc.), the communication node 212 retrieves the desired data (e.g., textual information) from a destination of the one or more of the information sources and converts the data via the TTS unit 252 into a response, which is then forwarded to the VRU client 232.

The response is then sent to the VRU client 232. The VRU client 232 processes the response and reads an audio message to the end user based upon the response. It is contemplated that the VRU server 234 can read the audio message to the end user using human recorded speech or synthesized speech. The TTS unit 252 is preferably a TTS 2000 software package, available from Lernout and Hauspie Speech Product NV, Burlington, Mass.

The ASR unit 254 provides speaker dependent or independent automatic voice recognition of voice communications from the end user. It is contemplated that the ASR unit 254 can include speaker dependent voice recognition. The ASR unit 254 processes the voice communications to determine whether a word or a speech pattern matches any of the grammars or vocabulary stored in the database server unit 244 or downloaded from the voice browser 250. When the ASR unit 254 identifies a selected speech pattern of the voice communications, the ASR unit 254 sends an output signal to implement the specific function associated with the recognized speech pattern. The ASR unit 254 is preferably a speaker independent voice recognition software package, RecServer Model, also available from Nuance Communications. It is contemplated that the ASR unit 254 can be any suitable voice recognition unit to detect voice communications.

The STT unit 256 receives voice communications and converts the voice communications to textual information (e.g., a text message). The textual information can be sent or routed to the communication devices 201, 202, 203, 204, 205, the content providers 208, 221, the markup language servers 209, 251, 253, 257, the voice browser 250 and the application server unit 242. The STT unit 256 is preferably a Naturally Speaking software package, available from Dragon Systems, Newton, Mass.

The VOIP unit 248 is preferably connected to the telephone switch 230 and the LAN 240. The VOIP unit 248 allows an end user to access the communication node 212 via the Internet 220 or VOIP public network using voice commands. The VOIP unit 248 can receive VOIP protocols (e.g., H.323 protocols) transmitted over the Internet 220 or Intranet, and can convert the VOIP protocols to voice information or data. The voice information can then be read to the end user via the VRU client 232.

The VOIP unit 248 can also receive voice communications from the end user and convert the voice communications to a VOIP protocol that can be transmitted over the Internet 220. The VOIP unit 248 is preferably a Voice Net software package, also available from Dialogic Corporation. It will be recognized that the VOIP unit 248 can be incorporated into a communication device.

The communication node 212 also includes a detection unit 260. The detection unit 260 is preferably a phrase or key word spotter unit, detecting incoming audio inputs or communications or DTMF signals from the end user. The detection unit 260 is preferably incorporated into the telephone switch 230, but can be incorporated into the VRU client 232, the carrier network 216 or the VRU server 234. The detection unit 260 is preferably included in a RecServer software package, also available from Nuance Communications.

The detection unit 260 records the audio inputs from the end user and compares the audio inputs to the vocabulary or grammar stored in the database server unit 244. The detection unit 260 continuously monitors the end user's audio inputs for a key phase or word after the end user is connected to the node 212. When the detection unit 260 detects the key phrase or word, the VRU client 232 plays a pre-recorded message to the end user. The VRU client 232 then responds to the audio inputs provided by the end user.

The billing server unit 238 is preferably connected to the LAN 240. The billing server unit 238 can record data about the use of the communication node 212 by an end user (e.g., length of calls, features accessed by the end user, etc.). Upon completion of a call by an end user, the call control unit 236 sends data to the billing server unit 238. The billing server unit 238 can subsequently process the data in order to prepare customer bills. The billing server unit 238 can use the ANI or CLI of the communication device to properly bill the end user. The billing server unit 238 preferably comprises a Windows NT compatible PC.

The gateway server unit 246 is preferably connected to the LAN 240 and the Internet 220. The gateway server unit 246 provides access to the content provider 221 and the voice markup language server 257 via the Internet 220. The gateway server unit 246 allows end users to access the communication node 212 from the communication device 202 via the Internet 220. The gateway server unit 246 can function as a firewall to control access to the communication node 212 to authorized end users. The gateway server unit 246 is preferably a Cisco Router, also available from Cisco Systems.

The database server unit 244 is preferably connected to the LAN 240. The database server unit 244 preferably includes a plurality of storage areas to store data relating to end users, such as, for example, speech vocabularies, dialogs, personalities, end user entered data and other information. Preferably, the database server unit 244 stores a personal file or address book. The personal address book can contain information required for the operation of the communication system 200, including end user reference numbers, personal access codes, personal account information, contact's addresses, telephone numbers, etc. The database server unit 244 is preferably a PC, such as, for example, a Windows NT compatible PC.

The application server unit 242 is preferably connected to the LAN 240 and the content provider 208. The application server unit 242 allows the communication node 212 to access information from a destination of the information sources, such as the content providers 208, 221 and the markup language servers 209, 251, 253, 257. For example, the application server unit 242 can retrieve information (e.g., weather reports, stock information, traffic reports, restaurants, flower shops, banks, calendars, "to-do" lists, e-commerce, etc.) from a destination of the information sources. This application server unit 242 may include Starfish Software to provide the address book, calendar and to-do lists, and to allow the end user to organize information. The application server unit 242 processes the retrieved information and provides the information to the VRU server 234 and the voice browser 250. The VRU server 234 can provide an audio announcement to the end user based upon the information using TTS synthesizing or human recorded voice. The application server unit 242 can also send tasks or requests (e.g., transactional information) received from the end user to the information sources (e.g., a request to place an order for a pizza). The application server unit 242 can further receive end user inputs from the VRU server 234 based upon a speech recognition output. The application server unit 242 is preferably a PC.

The voice markup language server 251 is preferably connected to the LAN 240. The voice markup language server 251 can include a database, scripts and markup language documents or pages. The voice markup language server 251 is preferably a PC, such as, for example, a Windows NT compatible PC. It will also be recognized that the voice markup language server 251 can be an Internet server (e.g., a Sun Microsystems server).

The messaging server 255 is preferably connected to the LAN 240, the paging network 211, an email system 213 and a short message system (SMS) 290. The messaging server 255 routes pages between the LAN 240 and the paging network 211. The messaging server 255 is preferably a PC, such as, for example, a Windows NT compatible PC. The messaging server 255 can also provide direct storage. It is contemplated that the messaging server 255 can reside externally from the communication node 212.

The voice browser 250 is preferably connected to the LAN 240. The voice browser 250 preferably receives information from the markup language servers 209, 251, 253, 257, the database server unit 244 and the content providers 208, 221. In response to voice commands or DTMF signals, the voice browser 250 generates a content request (e.g., an electronic address) to navigate to a destination of one or more of the information sources. The content request can use at least a portion of a Uniform Resource Locator, an Internet Protocol, a page request, or email.

After the voice browser 250 is connected to an information source, the voice browser 250 preferably uses a Transmission Control Protocol/Internet Protocol connection to pass requests to the information source. The information source responds to the requests, sending at least a portion of the requested information, represented in electronic form, to the voice browser 250. The information can be stored in a database, and can include text content, markup language document or pages, non-text content, dialogs, audio sample data, recognition grammars, etc. The voice browser 250 then parses and interprets the information, further described below. The voice browser 250 can be integrated into the communication devices 201, 202, 203, 204, 205.

As shown in FIG. 4, the content provider 208 is connected to the application server unit 242 of the communication node 212, and the content provider 221 is connected to the gateway server unit 246 of the communication node 212 via the Internet 220. The content providers 208, 221 can store various content information, such as, for example, news, banking, commerce, weather, traffic conditions, etc. The content providers 208, 221 can include a server to operate WWW pages or documents in the form of a markup language. The content providers 208, 221 can also include a database, scripts and/or markup language documents or pages. The scripts can include images, audio, grammars, computer programs, etc. The content providers 208, 221 execute suitable server software to send requested information to the voice browser 250.

The voice mail unit 274 is preferably connected to the telephone switch 203 and the LAN 240. The voice mail unit 274 can store voice mail messages from parties trying to send messages to the communication node 212. When an end user accesses the electronic network 206, the voice mail unit 274 can notify the end user of new and stored messages. The end user can access the messages to play, delete, store and forward the messages. When the end user accesses a message, the message can be read to the end user or can be displayed as textual information on a communication device (e.g., a pager, a SMS 290, or a PDA, etc.). The end user can also access and operate external messages or mail systems remote from the electronic network 206.

The FAX server unit 272 is preferably connected to the telephone switch 230 and the LAN 240. The FAX server unit 272 receivers and stores facsimile information sent via the electronic network 206 or the carrier network 216. Subscribers can access the facsimile information to play, store, delete, and forward the information. The facsimile information can be read via the TTS unit 252 or can be displayed as textual information on a suitable communication device. The FAX server unit 272 preferably comprises a PC, such as, for example, a Windows NT compatible PC or a Dialogue Fax Server.

Further information regarding communication system 200 is disclosed in U.S. patent application Ser. No. 09/141,485, entitled Telecommunication System and Methods Therefor, filed Aug. 27, 1998, the entire disclosure of which is incorporated herein.

It should be appreciated that the embodiments described above are to be considered in all respects only illustrative and not restrictive. The scope of the invention is indicated by the following claims rather than by the foregoing description. All changes that come within the meaning and range of equivalents are to be embraced within their scope.

We claim:

1. A method of processing a text signal comprising the steps of:

receiving an instruction signal from a first communication device at a communication node;

establishing a connection to a second communication device in accordance with the instruction signal;

receiving tones from the first communication device;

determining whether the second communication device is able to receive one of voice text messaging, and tones;

forwarding the tones to a tone-to-voice interface if the second communication device is able to receive the voice;

forwarding the tones to a tone-to-text messaging interface if the second communication device is able to receive the text messaging; and forwarding the tones to the second communication device if the second communication device is able to receive the tones.

2. The method of claim 1, further comprising the steps of:

converting the tones into a communication message; and forwarding the communication message to the second communication device.

3. The method of claim 2, wherein the communication message is one of a voice message and a text messaging-based message.

4. The method of claim 1, wherein the first communication device includes one of a TDD device, a TTD device, and a TTY device, a telephone, a paging unit, a cellular telephone, a satellite telephone, an Internet telephone and a personal computer.

5. The method of claim 1, wherein the second communication device includes one of a telephone, a paging unit, a cellular telephone, a satellite telephone, an Internet telephone and a personal computer.

6. The method of claim 1, wherein the second communication device includes one of a TDD, TTD and a TTY device.

* * * * *